Feb. 15, 1927. 1,617,871
A. STOCKSTROM
OVEN HEAT REGULATOR
Filed July 25, 1925
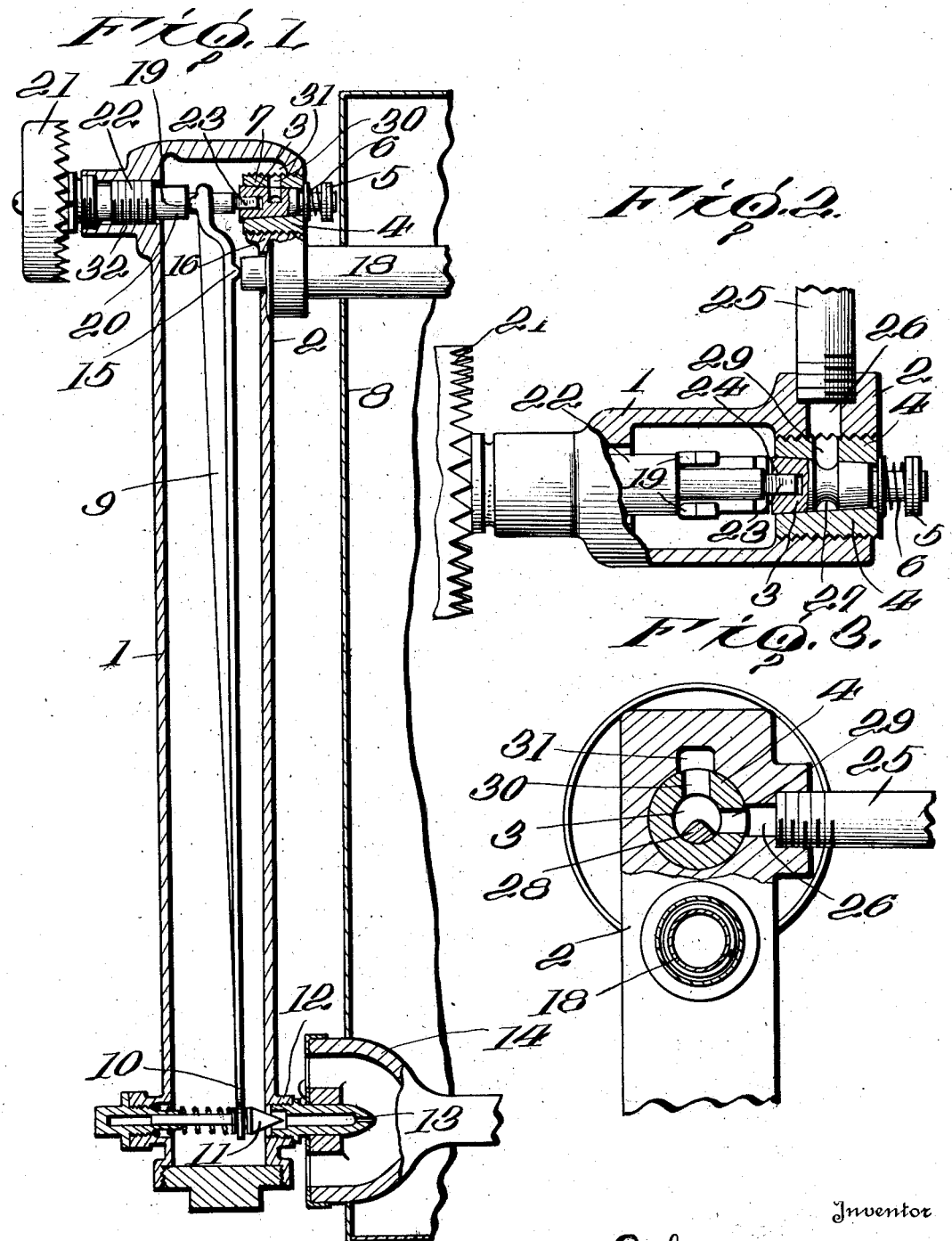
Inventor
A. Stockstrom,
By A. S. Pattison Sr.
Attorneys Patented Feb. 15, 1927.

1,617,871

UNITED STATES PATENT OFFICE.

ARTHUR STOCKSTROM, OF ST. LOUIS, MISSOURI, ASSIGNOR TO AMERICAN STOVE COMPANY, OF ST. LOUIS, MISSOURI, A CORPORATION OF NEW JERSEY.

OVEN HEAT REGULATOR.

Application filed July 25, 1925. Serial No. 46,022.

This invention relates to improvements in oven heat regulators, and it pertains to certain improvements upon that class of regulators shown in the patent to B. E. Meacham, No. 1,236,335 of August 7th, 1917.

It is the primary object of my present invention to construct the parts so that the thermostatic controlling means controls the supply of fuel for the thermostatically controlled valve, instead of having a separately operated fuel valve as shown in the Meacham patent.

A further object of the present invention is to have the manually operated thermostatic member extended and directly connected with the fuel valve, whereby the turning of the said member controls likewise the supply of fuel to the thermostatic valve.

Another object of my present invention is to so arrange and construct the manually operated thermostatic member with the fuel valve that in turning on the fuel valve the thermostatic valve is opened only sufficiently to supply sufficient gas for the minimum heat for the oven, or the arrangement is such that the thermostatic valve is not actuated until the fuel supply valve is opened.

In the accompanying drawings:

Figure 1 is a longitudinal sectional view of my improvement applied to a manually set heat regulator for ovens.

Fig. 2 is an enlarged horizontal sectional view of the invention.

Fig. 3 is an enlarged longitudinal sectional view showing the fuel valve in its open position.

In the B. E. Meacham patent, above referred to, there is a separate manually operated fuel valve for turning on and turning off the fuel or gas to a regulated thermostatically controlled valve, the regulator and the fuel valve requiring separate operations. By means of the present improvement, the supply of fuel to the thermostatic valve is controlled by the regulating wheel or member that regulates the thermostatic valve, thus requiring but a single operation, whereas in the B. E. Meacham patent, separate operations are necessary to accomplish the same result.

In the drawings, the type of heat regulator shown, comprises a housing 1, and passing through the upper end of the inner wall 2 is a fuel controlling valve 3. This valve is preferably in a sleeve 4, and the valve is of the ordinary tapered construction, carrying on its outer end the nuts 5, and between the nuts and the valve a spring 6, all of which is of the well-known construction, whereby the valve 3 is kept tightly seated. Preferably the sleeve for the valve is externally screw-threaded as at 7, so that the sleeve is removably fixed in the inner wall 2 of the housing.

In this type of thermostatic heat regulator for the oven 8, there is a vertically arranged lever 9, which has its lower end 10 suitably connected to a valve 11, that coacts with a suitable nipple 12 for controlling the flow of gas or fuel from the housing 1, through the outlet 13 of the nipple into the mixing chamber or tube 14, that is connected with the burner (not shown) in the oven.

Near the upper end of the lever 9 is a projection 15 that is in engagement with the member 16 of the thermostat 18 in the oven. The upper extremity of the lever 9 is bifurcated as shown in Fig. 2, and the ends are provided with projections 19 that are in engagement with the inner end of the stem 22 of the manually controlled member 21.

The screw-threaded stem 22 of the controlling member 21 is extended inward and has its end 23 angular in cross-section and fits in a similar shaped opening 24 that is made in the inner end of the valve 3. From the above contruction it will be understood that when the thermostatic manually controlled member 21 is turned, the valve 3 is likewise operated.

A gas supply pipe 25 passes into the side of the upper end of the housing 1, and communicates with a passage 26 made through the housing and the sleeve or bushing 4. The valve 3 is cut away, as shown at 27, except a projection 28 of a proper dimension to have its outer periphery close the opening 29 made in the sleeve 3.

With the parts in the position shown in Fig. 3, gas flows through the pipe 25 to the opening 26 in the housing, through the opening 29 in the sleeve 4, into the passageway or cut out part 27 of the valve 3 and thence through the opening 30 in the sleeve to the outlet passage 31 that communicates with the interior of the housing. It will be seen that gas or fuel therefore flows through the pipe 25 into the housing 1, down to the thermostatically controlled valve 11, at the lower end of the housing.

As shown in the drawing, the stem 20 of the member 21 is screw-threaded as at 32 and passes through an internally screw-threaded part of the outer wall of the housing 1, and this member operates on the lever 9 in the manner shown in the before mentioned B. E. Meacham patent.

A further description of the thermostatic control is considered unnecessary, since it is well understood by those skilled in the art from the said Meacham patent, the present improvement simply relating to the extension of the stem of the member 21 to engage directly the fuel valve 3, so that when the member 21 is operated, the fuel valve 3 is likewise operated.

The regulating member 21 will be provided with suitable numerals that will cooperate with a pointer or index, thus indicating the degrees of heat in the oven that the thermostatic valve regulates, as will be readily understood by those skilled in this art.

Variations in the structure may be made without departing from the scope and spirit of the invention, so long as the changes are within the scope of a proper interpretation of the appended claims.

Having thus described my invention, what I claim and desire to secure by Letters Patent is:

1. An oven heat regulator comprising a housing containing a burner fuel valve, a second fuel valve located in one wall of the housing, and a manually adjustable member passing through the opposite wall of said housing and operating said burner valve and also directly engaging the said fuel valve, whereby both valves are operatively connected with the manually adjustable member.

2. A heat regulator comprising a housing, a thermostatically controlled fuel burner valve, a fuel valve located in one wall of the housing, and a manually operative member passing through the other wall and engaging the said fuel valve and the thermostatic control for the fuel valve, whereby both valves are manually controlled.

3. A heat regulator comprising a housing, a thermostatically controlled valve, a rotating adjustable member passing through one wall of the housing, a fuel valve passing through the opposite wall of the housing and arranged substantially concentric with the adjustable member, said adjusting member regulating the thermostatic control and interlocking with the fuel valve, whereby both valves are manually operative.

4. A heat regulator comprising a housing, a thermostatic valve, a rotating regulating member for the thermostatic valve passing through one wall of the housing, a rotating fuel valve passing through the opposite wall of the housing, the regulating member and the fuel member interlocking, the fuel valve having an elongated passageway to permit it to be turned after it is open without affecting the flow of fuel therethrough for the purpose described.

5. A heat regulator comprising a housing, a thermostatically controlled valve, a rotating adjustable member controlling said valve and passing through one wall of the housing, a fuel valve passing through the opposite wall of the housing, said rotating member interlocking with the fuel valve, said fuel valve having an elongated passageway and the housing having a passageway communicating with the interior and exterior of the housing, said fuel valve having a short projection adapted to control the passageway through the housing, the parts adapted to operate as described.

6. A heat regulator for ovens comprising a housing, a thermostatically controlled valve at one end of the housing, a rotating adjustable member at the opposite end of the housing, a lever operatively connecting the rotatable member with the thermostatic valve, a fuel valve passing through that wall of the housing opposite the adjustable member, the adjustable member and the fuel valve operatively connected within the housing, whereby the adjustable member operates both valves.

7. A heat regulator comprising a housing, a burner valve located at one end of the housing, an adjustable member located at the opposite end of the housing, a lever engaging the valve and the adjustable member, a thermostatic member engaging the lever between said members, and a fuel valve operable by the adjustable member.

8. A thermostatic regulator for ovens comprising a housing, a fuel valve at one end of the housing, a manually operated adjustable member located at the opposite end of the housing, a lever having its respective ends engaging the valve, an adjustable member, a thermostatic member engaging the lever between the said members, and a second fuel valve located substantially concentric with the manually adjustable member and operated thereby.

9. A heat regulator for ovens comprising a housing, a fuel valve controlling an opening in the housing, a manually operated adjustable member passing through the wall of the housing, a lever having one end operating the valve and its opposite end engaging the manually adjustable member, a thermostatic member passing through the wall of the housing and engaging the lever intermediate its ends, an adjustable member, a second fuel valve passing through the housing, the adjustable member interlocking with the fuel valve, the parts operating as described.

10. An oven heat regulator comprising a housing containing a burner valve, a fuel valve passing through one wall of the housing, a thermostatic member passing through the same wall of the housing, a lever having one end engaging the burner valve, an adjustable member engaging the other end of the lever and engaging the fuel valve and the thermostatic member engaging the lever between its ends, the parts operating as described.

11. An oven heat regulator comprising a housing, a burner valve at one end of the housing, a fuel valve at the other end of the housing passing through one wall thereof, a lever having one end engaging the burner valve, an adjusting member passing through the other wall of the housing and engaging the opposite end of the lever and also engaging said fuel valve, and a thermostatic member passing through the housing and engaging the lever intermediate its ends.

12. An oven heat regulator comprising a housing, a fuel valve passing through one wall of the housing, an adjusting member passing through the other wall of the housing and having its inner end engaging the fuel valve, a thermostatically controlled valve located in the housing and operative by the adjusting member whereby the thermostatically controlled member and the fuel valve are operatively connected with the adjusting member.

In testimony whereof I hereunto affix my signature.

ARTHUR STOCKSTROM.